(12) United States Patent
Sasaki

(10) Patent No.: US 12,058,449 B2
(45) Date of Patent: Aug. 6, 2024

(54) IMAGE CAPTURING APPARATUS AND CONTROL METHOD THEREOF AND STORAGE MEDIUM

(71) Applicant: CANON KABUSHIKI KAISHA, Tokyo (JP)

(72) Inventor: Takao Sasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 17/930,775

(22) Filed: Sep. 9, 2022

(65) Prior Publication Data

US 2023/0092741 A1 Mar. 23, 2023

(30) Foreign Application Priority Data

Sep. 21, 2021 (JP) .................................. 2021-153619

(51) Int. Cl.
*H04N 23/745* (2023.01)
*H04N 23/72* (2023.01)
*H04N 23/741* (2023.01)

(52) U.S. Cl.
CPC ........... *H04N 23/745* (2023.01); *H04N 23/72* (2023.01); *H04N 23/741* (2023.01)

(58) Field of Classification Search
CPC .... H04N 23/745; H04N 23/72; H04N 23/741; H04N 23/73; H04N 23/76
See application file for complete search history.

(56) References Cited

U.S. PATENT DOCUMENTS

2011/0317027 A1* 12/2011 Shinmei ............... H04N 23/741
　　　　　　　　　　　　　　　　　　　　　　　348/E5.037
2020/0177788 A1* 6/2020 Jiang .................... H04N 25/585

FOREIGN PATENT DOCUMENTS

JP　　2009-038670 A　　2/2009
JP　　2021-057626 A　　4/2021

* cited by examiner

*Primary Examiner* — Ahmed A Berhan
(74) *Attorney, Agent, or Firm* — Cowan, Liebowitz & Latman, P.C.

(57) ABSTRACT

An image capturing apparatus comprises an image sensor configured to be capable of outputting a plurality of images with different gains with a single exposure; an acquisition unit configured to acquire, by performing a plurality of times of image capturing with different exposure times using the image sensor, a plurality of images with different gains in each of the plurality of times of image capturing; and a combining unit configured to combine the images acquired by the acquisition unit, wherein the combining unit uses an image obtained by image capturing with a longer exposure time among the plurality of times of image capturing with the different exposure times for combining for a region of a flicker light source.

13 Claims, 13 Drawing Sheets

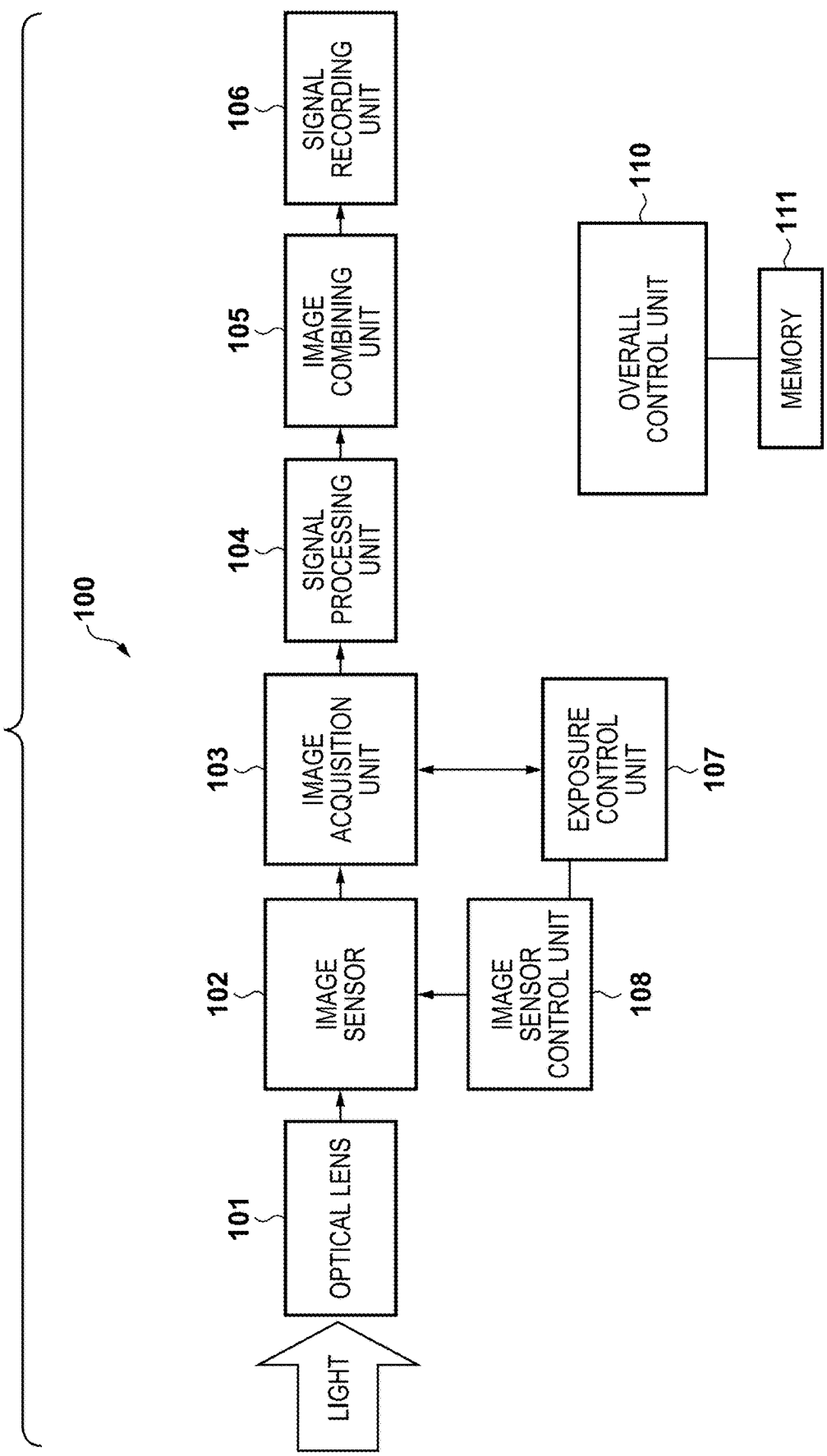

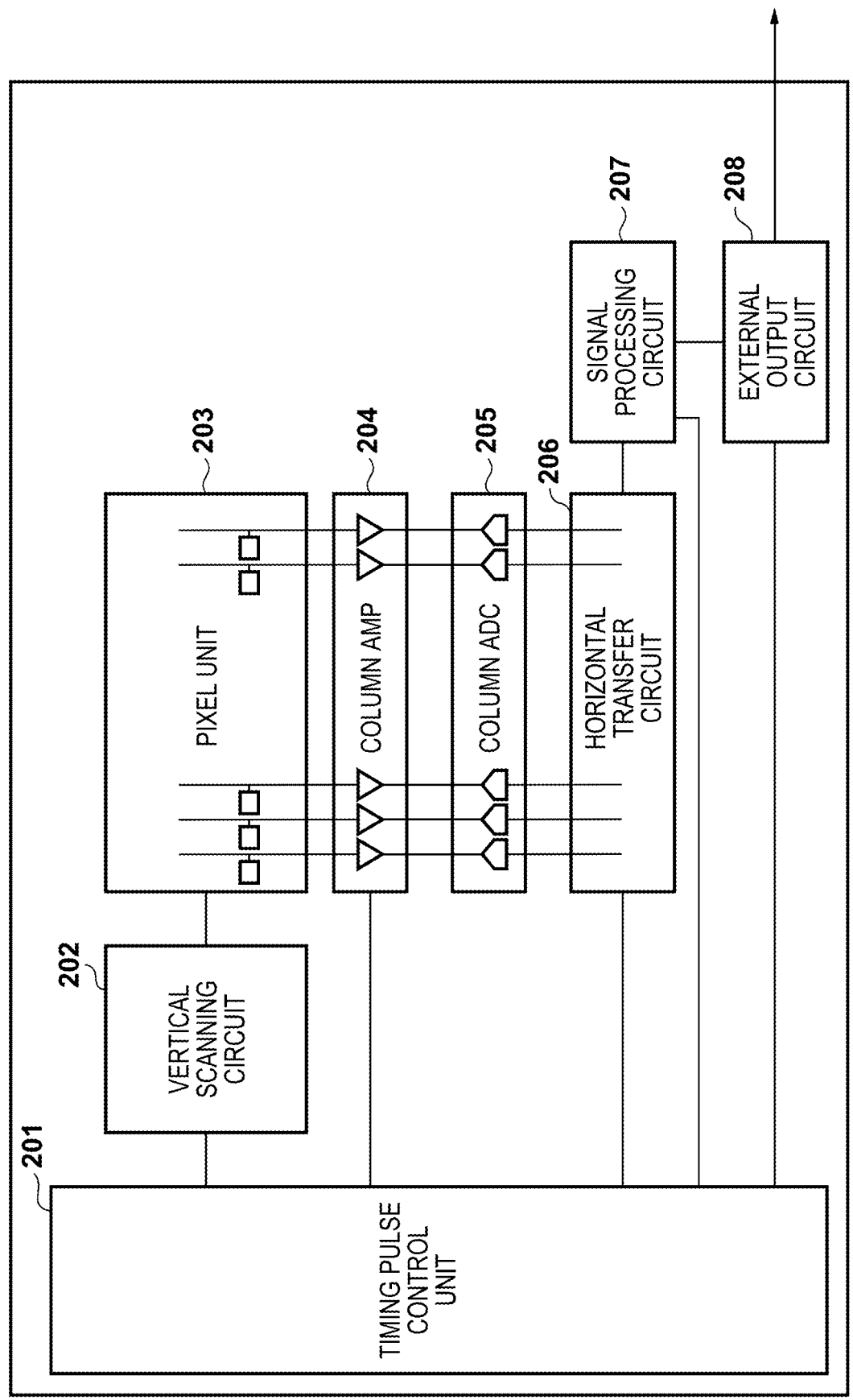

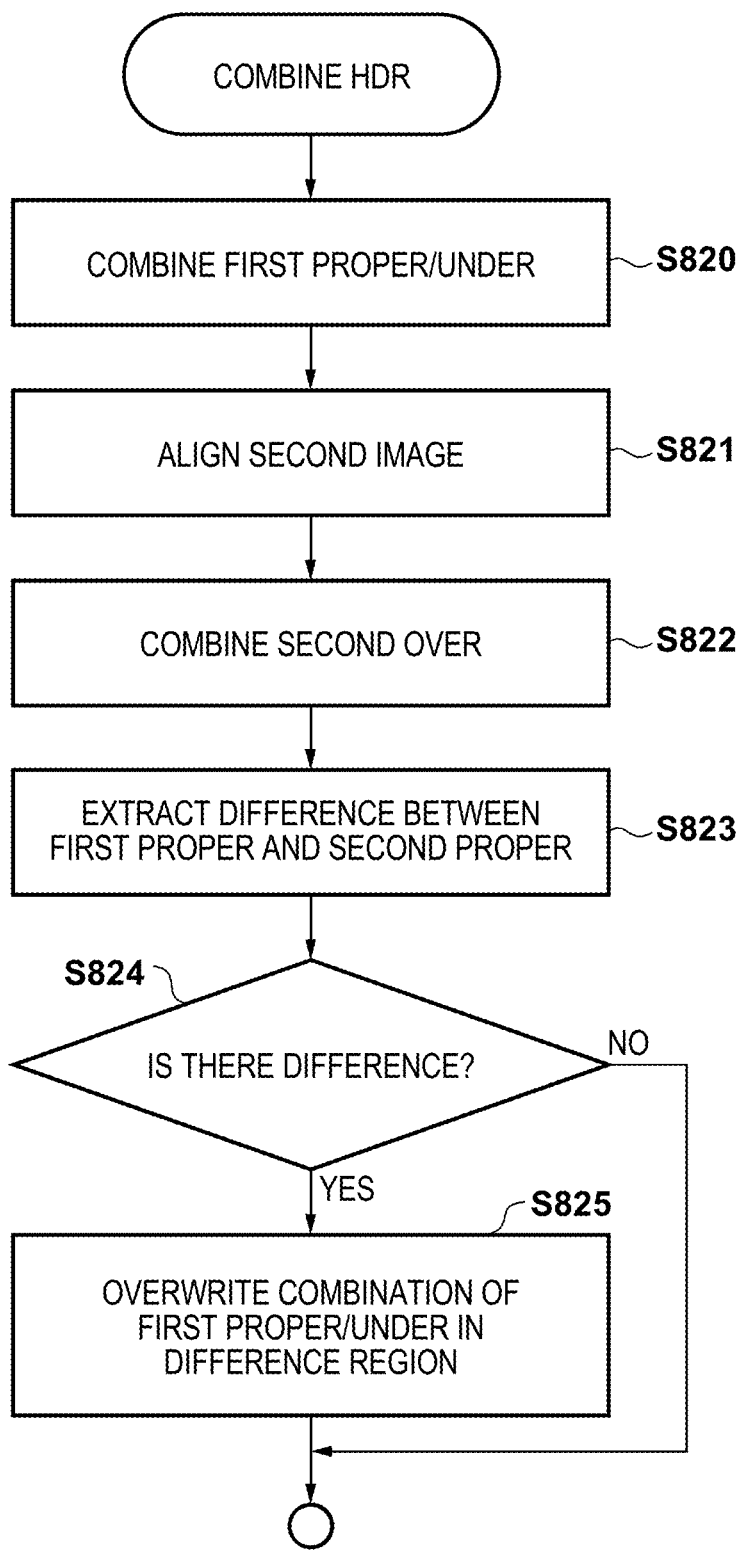

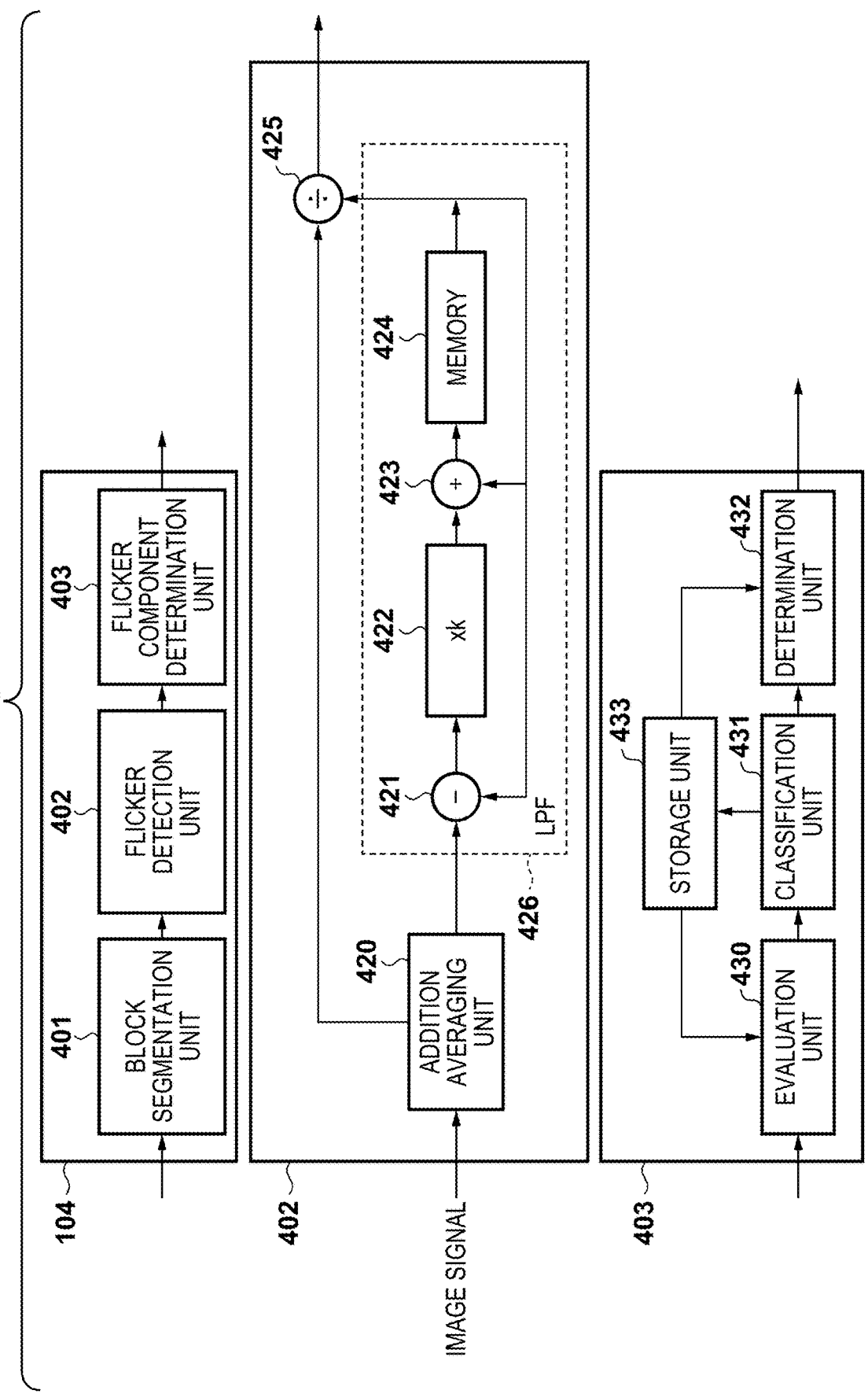

FIRST DGO DEVELOPED IMAGE

PROPER EXPOSURE IMAGE

UNDEREXPOSED IMAGE

SECOND DGO DEVELOPED IMAGE

PROPER EXPOSURE IMAGE

OVEREXPOSED IMAGE

DIFFERENCE IMAGE
701
703
PROPER EXPOSURE
DIFFERENCE IMAGE

FLICKER REGION

FLICKER REGION
DIFFERENCE IMAGE

COMBINED IMAGE
701
703
HDR COMBINATION
(BEFORE MOVING BODY
REPLACEMENT)

HDR COMBINATION
(AFTER MOVING BODY
REPLACEMENT)

AFTER
FLICKER REPLACEMENT

FIRST DGO DEVELOPED IMAGE

PROPER EXPOSURE IMAGE

UNDEREXPOSED IMAGE

SECOND DGO DEVELOPED IMAGE

PROPER EXPOSURE IMAGE

OVEREXPOSED IMAGE

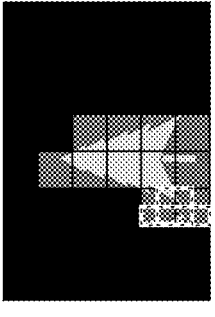

FIG. 8E
DIFFERENCE IMAGE
PROPER EXPOSURE DIFFERENCE IMAGE

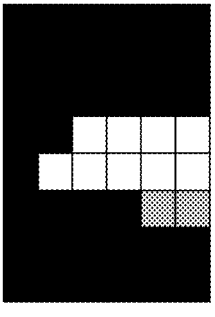

FIG. 8F
FLICKER REGION RELIABILITY

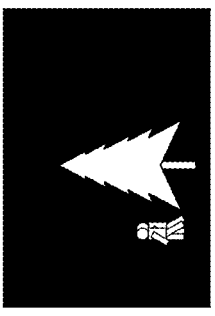

FIG. 8G
FLICKER REGION DIFFERENCE IMAGE

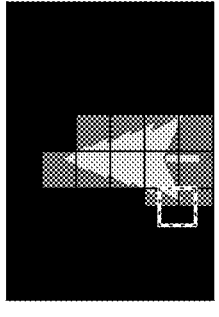

FIG. 8H
DIFFERENCE IMAGE
PROPER EXPOSURE LUMINANCE DIFFERENCE IMAGE

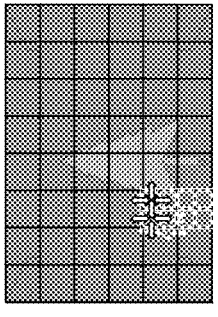

FIG. 8I
PROPER EXPOSURE COLOR DIFFERENCE IMAGE

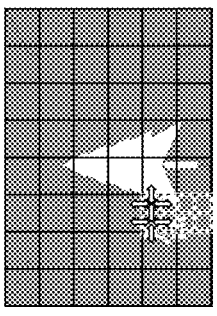

FIG. 8J
FLICKER REGION DIFFERENCE IMAGE (FINAL)

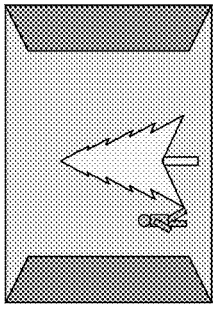

FIG. 8K
COMBINED IMAGE
HDR COMBINATION (BEFORE MOVING BODY REPLACEMENT)

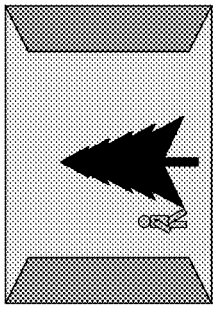

FIG. 8L
HDR COMBINATION (AFTER MOVING BODY REPLACEMENT)

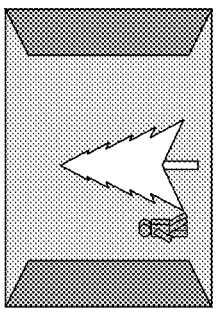

FIG. 8M
AFTER FLICKER REPLACEMENT

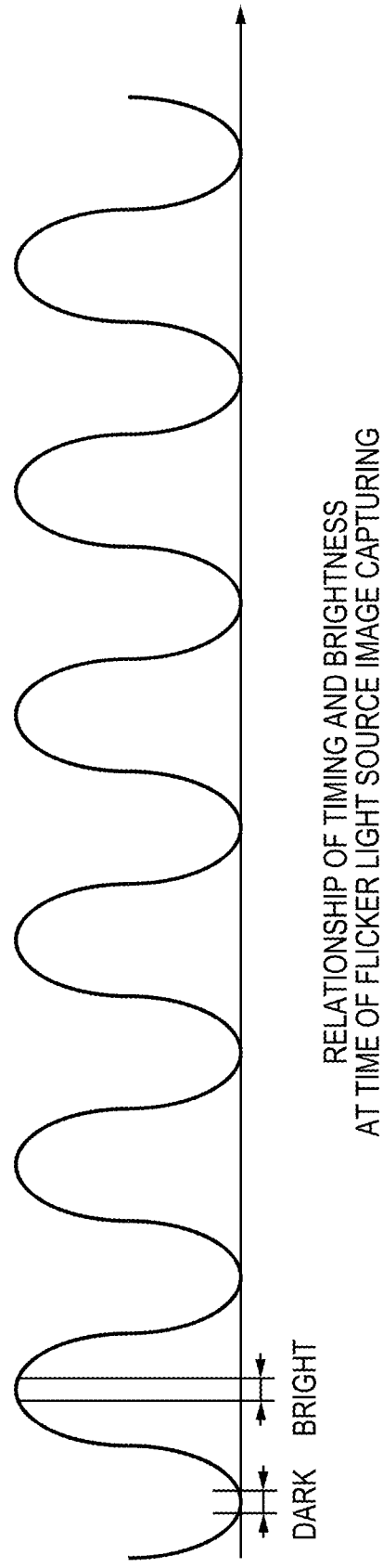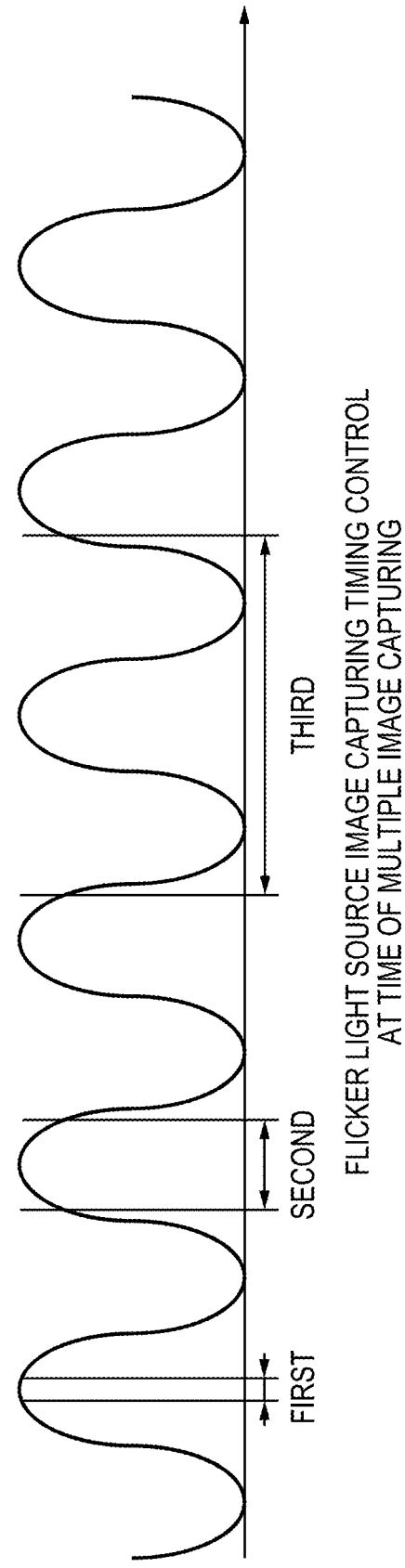

OVEREXPOSURE
FLICKER LIGHT SOURCE
OVEREXPOSURE (IDEAL FORM)

UNDEREXPOSURE
UNDEREXPOSURE (IDEAL FORM)

PROPER EXPOSURE
IDEAL FORM
PROPER EXPOSURE (IDEAL FORM)

OVEREXPOSURE
OVEREXPOSURE (ACTUAL IMAGE CAPTURE)

UNDEREXPOSURE
UNDEREXPOSURE (ACTUAL IMAGE CAPTURE)

PROPER EXPOSURE
ACTUAL IMAGE CAPTURE
PROPER EXPOSURE (ACTUAL IMAGE CAPTURE)

IMAGE CAPTURING APPARATUS AND CONTROL METHOD THEREOF AND STORAGE MEDIUM

BACKGROUND OF THE INVENTION

Field of the Invention

The present invention relates to a technique for combining a plurality of images, to increase an image dynamic range.

Description of the Related Art

As described in Japanese Patent Laid-Open No. 2021-57626, a technique of combining (high dynamic range (HDR) combining) a plurality of images captured under different exposure conditions (for example, a high exposure image, an appropriate exposure image, and a low exposure image) has been known. This makes it possible to expand the dynamic range expressible with a single image.

Also known is an image sensor (dual gain output (DGO)) that includes two column circuits for an output signal from a unit pixel, and is provided with amplification units having different gains in the column circuits to output images with different gains. This image sensor can output two images with different gains (high gain and low gain images), with a single exposure. The combining of two images with different gains by the DGO is advantageous compared with the combining of two images obtained by time-division exposure, since the DGO requires no alignment processing and can be effectively used for moving bodies. Thus, the technique is suitably used with the HDR combining, which is a method of obtaining an image with an expanded dynamic range.

It has been known that when an image of a flicker light source, typically illuminations, is captured, the image captured is affected by the period of the flicker light source, exposure time, and image capturing timing. Various countermeasures for this have been disclosed, including one described in Japanese Patent Laid-Open No. 2009-38670, in which regions in a screen are classified based on a flicker component detected and a correction value for correcting the flicker component is generated.

A plurality of images of a flicker light source, typically illuminations, sequentially captured tend to fail to satisfactorily express the flicker light source. This is because as illustrated in FIG. 9A and FIG. 10A to FIG. 10F, the brightness of the flicker light source differs depending on the image capturing timing when the exposure time is shorter than the period of the flicker light source. The brightness differs among individual images as a matter of course, and due to the difference in the brightness of the flicker light source between a plurality of images differing to the exposure setting at the time of image capturing, the combined image seems to be unnatural. In view of this, the flicker light source is preferably simultaneously exposed.

However, even when the simultaneous exposure is implemented through a method such as the DGO, depending on the timing, the flicker light source in the captured image may seem darker than it actually looks. This occurs depending on the relationship between the flicker period and the exposure time, and occurs in particular when images are captured with an exposure time shorter than the period of the flicker light source. In this case, the brightness of the flicker light source does not vary between the plurality of captured images, but the captured images are darker than expected.

As a known method to avoid these phenomena, for example as illustrated in FIG. 9B, the exposure time for capturing images of the flicker light source is set to be longer than the flicker period, to reduce the influence of the flicker light source on each image. As a known method also illustrated in FIG. 9B, a plurality of images are captured at a timing when the flicker light source has the maximum brightness.

However, in any of the methods described above, there is a problem in that image capturing is constrained, meaning that the usability of the image capturing apparatus is compromised.

SUMMARY OF THE INVENTION

The present invention, which has been made in view of the aforementioned problem, improves image quality when HDR image capturing is performed in an environment including a flicker light source.

According to a first aspect of the present invention, there is provided an image capturing apparatus comprising: an image sensor configured to be capable of outputting a plurality of images with different gains with a single exposure; and at least one processor or circuit configured to function as: an acquisition unit configured to acquire, by performing a plurality of times of image capturing with different exposure times using the image sensor, a plurality of images with different gains in each of the plurality of times of image capturing; and a combining unit configured to combine the images acquired by the acquisition unit, wherein the combining unit uses an image obtained by image capturing with a longer exposure time among the plurality of times of image capturing with the different exposure times for combining for a region of a flicker light source.

According to a second aspect of the present invention, there is provided a method of controlling an image capturing apparatus including an image sensor configured to output a plurality of images with different gains with a single exposure, the method comprising: acquiring, by performing a plurality of times of image capturing with different exposure times using the image sensor, a plurality of images with different gains in each of the plurality of times of image capturing; and combining the images acquired in the acquiring, wherein in the combining, an image obtained by image capturing with a longer exposure time among the plurality of times of image capturing with the different exposure times is used for a region of a flicker light source.

Further features of the present invention will become apparent from the following description of exemplary embodiments with reference to the attached drawings.

BRIEF DESCRIPTION OF THE DRAWINGS

FIG. 1 is a block diagram illustrating a configuration of a digital camera, which is a first embodiment of an image capturing apparatus of the present invention;

FIG. 2 is a diagram illustrating a block configuration of a solid-state image sensor;

FIG. 3A to FIG. 3D are flowcharts illustrating an image combining operation;

FIG. 4 is a block diagram illustrating a configuration of a signal processing unit;

FIG. 8A to FIG. 8M are conceptual diagrams of developed images and combined images according to a second embodiment;

FIG. 9A and FIG. 9B are diagrams illustrating a relationship between a flicker light source and image capturing timing.

DESCRIPTION OF THE EMBODIMENTS

Figure 3A:
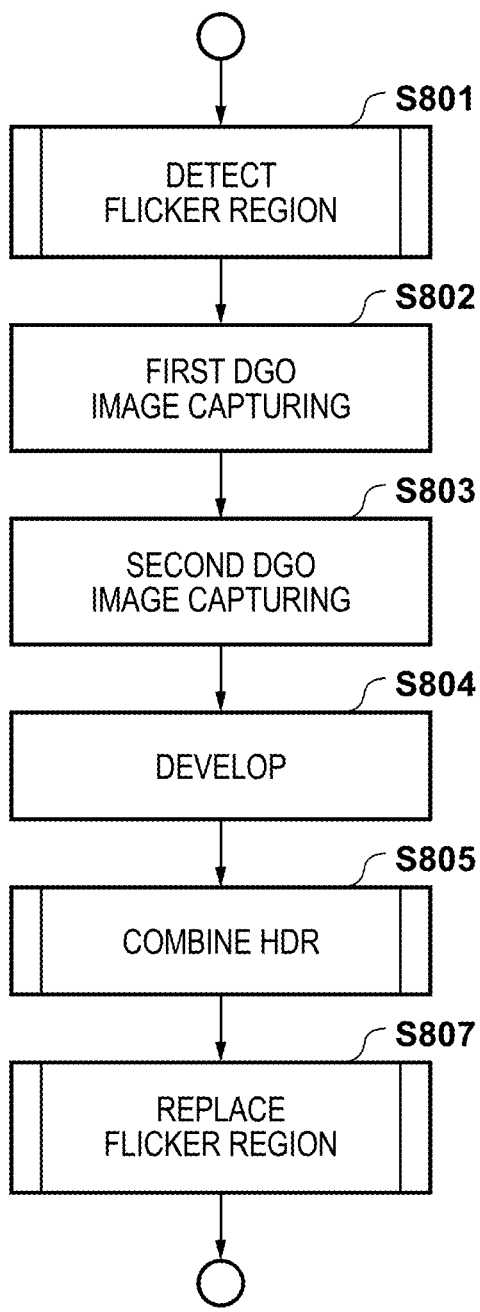

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration of a digital camera 100, which is a first embodiment of an image capturing apparatus of the present invention.

In FIG. 1, an optical lens 101 focuses light reflected from a subject, to form a subject image on an imaging plane of an image sensor 102.

The image sensor 102 converts the subject image, formed by the optical lens 101, into an electrical signal, and outputs it as an image signal. A charge coupled device (CCD) image sensor, a CMOS image sensor, or the like is used for the image sensor 102. These types of the image sensor 102 include those that directly output an analog image signal, and those that, through performing analog-to-digital (AD) conversion processing in the image sensor 102, output digital data including low voltage differential signaling (LVDS).

FIG. 2 is a diagram illustrating a block configuration of the image sensor 102 used in the present embodiment.

A timing pulse control unit 201 supplies an operation clock CLK and a timing signal to each block of the image sensor 102 to control the operation of the image sensor 102.

A vertical scanning circuit 202 performs timing control for sequentially reading, in a single frame, pixel signal voltage from a pixel unit 203 in which a plurality of pixels are two-dimensionally arranged. The image signals are read sequentially row by row from the top row to the bottom row in a single frame.

Each pixel of the pixel unit 203 is a photoelectric conversion element configured to perform photoelectric conversion on incident light and output voltage corresponding to the amount of the light. In the present embodiment, the pixel unit 203 converts incident light into charges, and accumulates the charges as voltage in a floating diffusion (FD) capacitor. The capacity of the FD capacitor is variable, and can be changed in accordance with ISO sensitivity to improve an SN. Basically, the capacity is set to be large for low ISO sensitivity, and is set to be small for high ISO sensitivity. In a case of outputting two images with different gains, which will be described later, the capacity for accumulating charges is common between the two gains. In the present embodiment, the capacity is described to be of two types (large and small), but this should not be construed in a limiting sense, and may be set in three levels or more.

A column amplifier (column AMP) 204 is used for electrically amplifying a signal read from the pixel unit 203. With the column AMP 204 amplifying the signal, a pixel signal level is amplified with respect to noise generated in a subsequent column AD converter (ADC) 205, so that the SN can actually be improved. Also, the gain of the column AMP can be changed by the timing pulse control unit 201. The image sensor 102 according to the present embodiment includes two input memories provided in the column AMP 204 to generate a high dynamic range image (HDR image). Two types of signals can be output with the column AMP gain varied. With the two input memories, outputs can be obtained by applying two different gains to a signal at a certain time point read from the FD capacitor. Thus, while a data amount is increased, two images with different gains and having simultaneity can be obtained. Note that, although the number of outputs in the present embodiment is two, the number of simultaneous outputs is not limited to two.

The column ADC 205 performs analog-to-digital conversion on the signal output from the column AMP 204. The digital signal thus obtained is read sequentially by a horizontal transfer circuit 206. The output from the horizontal transfer circuit 206 is input to a signal processing circuit 207. The signal processing circuit 207 is a circuit that performs digital signal processing, and in addition to adding an offset value of a certain amount through the digital processing, can easily perform gain calculation by performing shift calculation or multiplication. Furthermore, the pixel unit 203 can be provided with an intentionally light-shielded pixel region, and the signal processing circuit 207 may perform digital black level clamping operation using this region.

The output from the signal processing circuit 207 is input to an external output circuit 208. The external output circuit 208 has a serializer function and converts multi-bit input parallel signals from the signal processing circuit 207 into serial signals. The circuit further converts the serial signals into LVDS signals or the like for example, and outputs the signals as signals for exchanging image information with an external device.

Referring back to FIG. 1, an image acquisition unit 103 acquires an image signal output from the image sensor 102 and performs various types of processing thereon. When the AD conversion is not performed inside the image sensor 102, an analog front end configured to perform analog-to-digital conversion is also included. The image acquisition unit 103 removes fixed pattern noise of the image sensor 102, and performs the black level clamping processing and the like. The unit is further in charge of separating between an image signal used for recording and an evaluation signal for controlling the image sensor.

A signal processing unit 104 has a pixel addition function, which is a representative image processing function of the digital camera 100, and performs various types of image processing such as noise reduction processing, gamma correction processing, knee correction processing, digital gain processing, and defect correction processing. The image acquisition unit 103 and the signal processing unit 104 further include a storage circuit that stores setting values required for each type of correction and image processing. The signal processing unit 104 further performs detection of a flicker region. This will be described in detail below.

An image combining unit 105 performs HDR image combining, from an HDR generation signal output from the image sensor 102, by using any appropriate combining method. For example, there is a method of combining in which an image with a high gain is used for a normal image, and an image with a low gain is used for a bright overexposed portion in the normal image. However, the combining algorithm of the present embodiment is not limited to this, and any method of combining two images with different gains may be employed.

A signal recording unit 106 records the image signal output from the image combining unit 105 in a storage device or a storage medium. An exposure control unit 107 can calculate an appropriate exposure amount by using image signal information output from the image acquisition unit 103. The exposure control unit 107 determines and controls an operation of an image sensor control unit 108.

An overall control unit 110 includes a CPU connected to each block of the digital camera, and performs overall control of the digital camera 100 by executing a program stored in a memory 111.

FIG. 3A to FIG. 3D are diagrams illustrating a flow of image combining according to the present embodiment. A procedure of processing for the image combining will be described below with reference to FIG. 3A to FIG. 3D.

In step S801 in FIG. 3A, the overall control unit 110 uses the signal processing unit 104 to detect a flicker region.

Figure 3B:
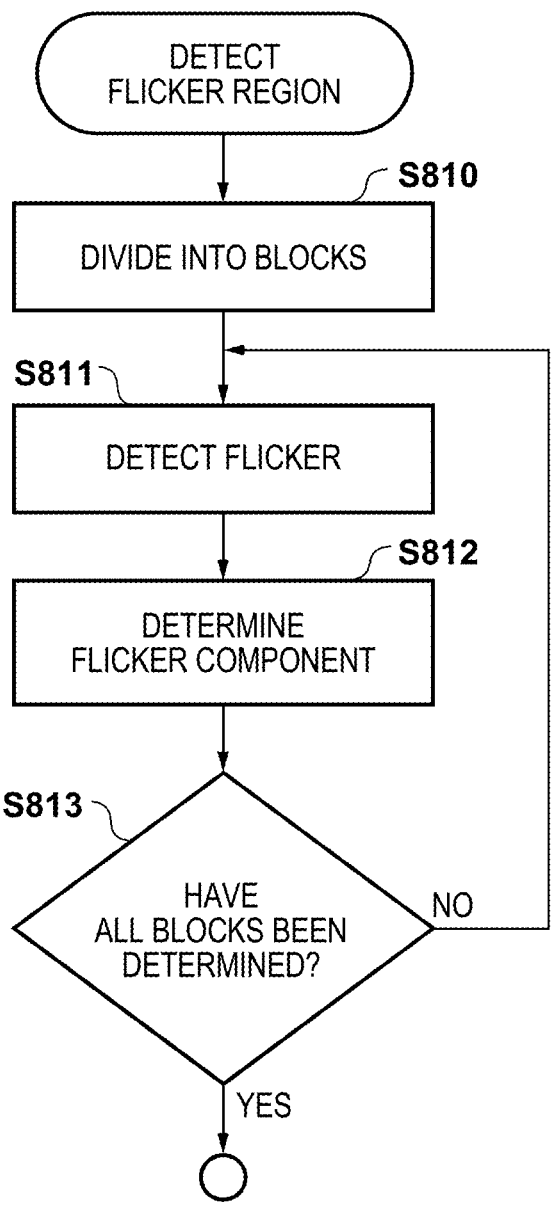
Figure 3D:
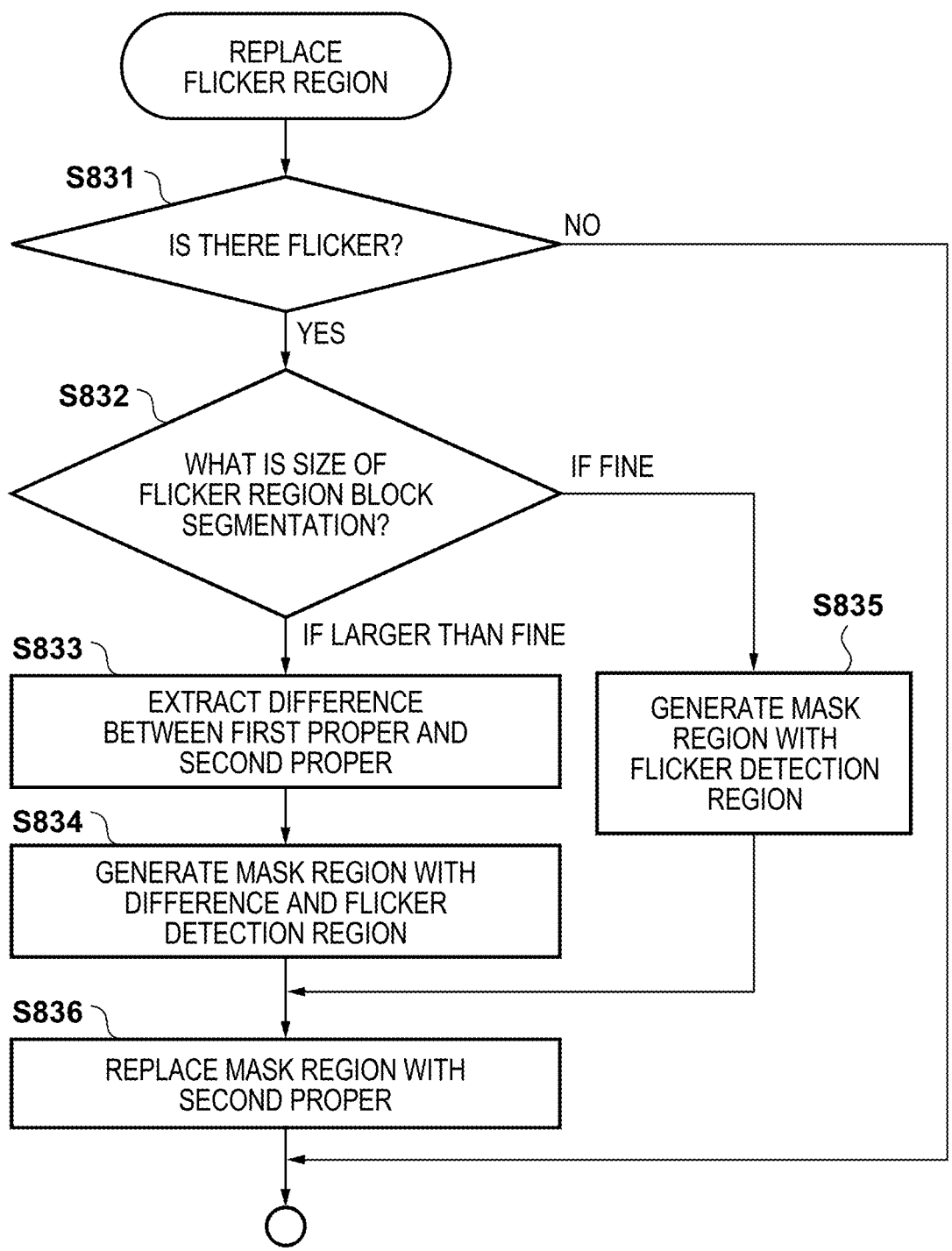

A method of detecting a flicker region is described with reference to FIG. 3B. In step S810, the signal processing unit 104 performs block segmentation on an image. A block segmentation unit 401 in FIG. 4 is assumed to process an image signal captured by an XY addressing type image sensor such as a CMOS image sensor. In the present embodiment, it is assumed that the image signal is read by horizontal scanning. For an image signal corresponding to a single screen, segment blocks are set in a horizontal direction and a vertical direction. It is assumed that the block segmentation is performed to obtain M blocks in the horizontal direction and N blocks in the vertical direction, and each of the blocks is set to be a flicker detection frame.

In step S811, a flicker detection unit 402 in FIG. 4 performs flicker detection. An addition averaging unit 420 of the flicker detection unit 402 calculates an average value of the pixel luminance level, for each of the flicker detection frames set by the block segmentation unit 401. A subtractor 421, a multiplier 422, an adder 423, and a memory 424 perform the following calculation, and thus form what is known as a recursive low pass filter 426.

$$\text{mem} = \text{ave} \times k + \text{mout}(1-k) \quad (1)$$

In the formula, ave represents an output from the addition averaging unit 420; mout represents an output from the memory 424; mem represents an output from the adder 423, as a value newly stored in the memory 424; and k represents a filter coefficient of the recursive low pass filter 426.

A divider 425 calculates and outputs a flicker component for each flicker detection frame by dividing the output from the addition averaging unit 420 and the output from the memory 424.

In step S812, a flicker component determination unit 403 determines a flicker component. An evaluation unit 430 of the flicker component determination unit 403 evaluates the reliability of the detection result of the flicker detection unit 402. Additionally, a classification unit 431 classifies the reliability evaluation results of the evaluation unit 430. A determination unit 432 uses the classification result output from the classification unit 431 to determine a variation component (flicker component) of a single type of signal level in the vertical direction to be corrected. A storage unit 433 stores status data on a certain flicker component (hereinafter, referred to as a flicker model).

The evaluation unit 430 reads the flicker model from the storage unit 433. The evaluation unit 430 uses the calculation in Formula (2), for example, and determines a difference between the flicker component detected by the flicker detection unit 402 from the flicker detection frame that is the processing target and the corresponding flicker model, as information indicating the level of correlation therebetween for each detection frame.

$$|a_{xy} - b_{xy}| \quad (2)$$

In the formula, x and y represent the coordinate positions of each flicker detection frame (1≤x≤M, 1≤y≤N), $a_{xy}$ represents the value of the flicker component of each flicker detection frame in the flicker model, and $b_{xy}$ represents the value of the flicker component of each flicker detection frame in the flicker detected by the flicker detection unit 402.

Then, the evaluation unit 430 determines whether the obtained difference is larger than a predetermined threshold Th for each flicker detection frame. When the difference is determined to be equal to or smaller than the threshold Th, the reliability of the flicker component detected in the corresponding flicker frame is determined to be high. The reliability evaluation for each of the flicker detection frames may be performed for a plurality of the flicker models. In this case, for each of the flicker models, information on a reliable flicker detection frame (the position and the number of such a flicker detection frame, for example) is stored in the storage unit 433, for example.

The classification unit 431 refers to the storage unit 433, and classifies the flicker detection frames based on the result of the reliability evaluation by the evaluation unit 430. Specifically, regions in a screen are classified based on the flicker component.

Figure 5:
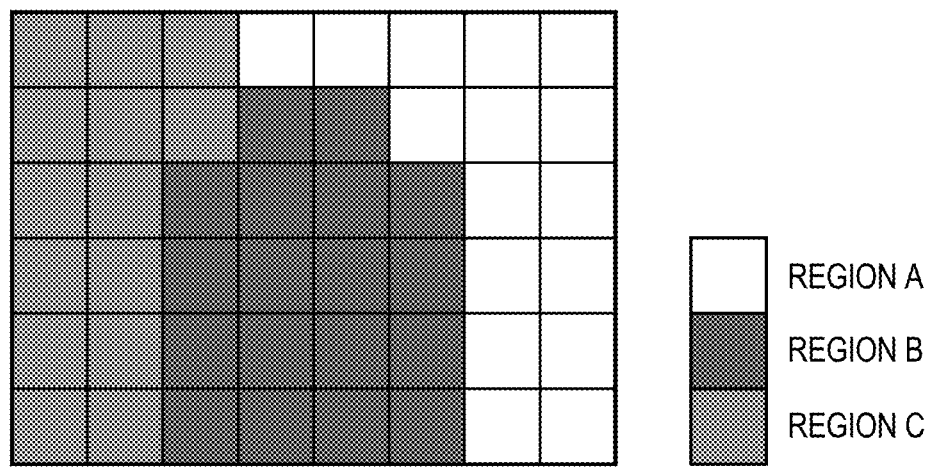
FIG. 5 is a conceptual diagram of a flicker region.

FIG. 5 is a diagram schematically illustrating a classification example, in a case where the reliability evaluation is performed on three flicker models A, B, and C. In the example illustrated in FIG. 5, M=8 and N=6, meaning that 48 flicker detection frames are set. A region A is a region including a flicker detection frame determined to be reliable in the reliability evaluation for the flicker model A. Similarly, a region B and a region C are regions including flicker detection frames determined to be reliable for the flicker models B and C, respectively. Note that the regions may overlap.

The classification unit 431 thus classifies the flicker detection frames by the flicker model determined to be reliable. This also means that the flicker detection frames are classified based on the detected flicker components. The classification unit 431 outputs classification information indicating the classification result to the determination unit 432. The classification information may include a classification to which the flicker detection frame belongs, a position of the flicker detection frame in the entire screen, the number of flicker detection frames belonging to the same classification, the proportion of the flicker detection frame in the entire screen, and the like. The determination unit 432 determines a flicker model determined to be reliable, for each of the blocks obtained by segmentation by the block segmentation unit 401. Furthermore, whether the block includes a flicker light source is determined.

This processing in steps S811 to S813 is repeated until the flicker region detection is completed for all the blocks, whereby the region including the flicker light source can be recognized. This is one example of the flicker detection method, and the flicker detection method is not limited to this.

Referring back to FIG. 3A, next, in steps S802 and S803, the overall control unit 110 performs the first and the second DGO image capturing.

The operation of the image sensor 102 and the image combining unit 105 in this process will be described. As described above, the image sensor of the present embodiment can, to generate an HDR image, change the gain of the column AMP 204 and simultaneously output image signals with different gains.

Figure 6:
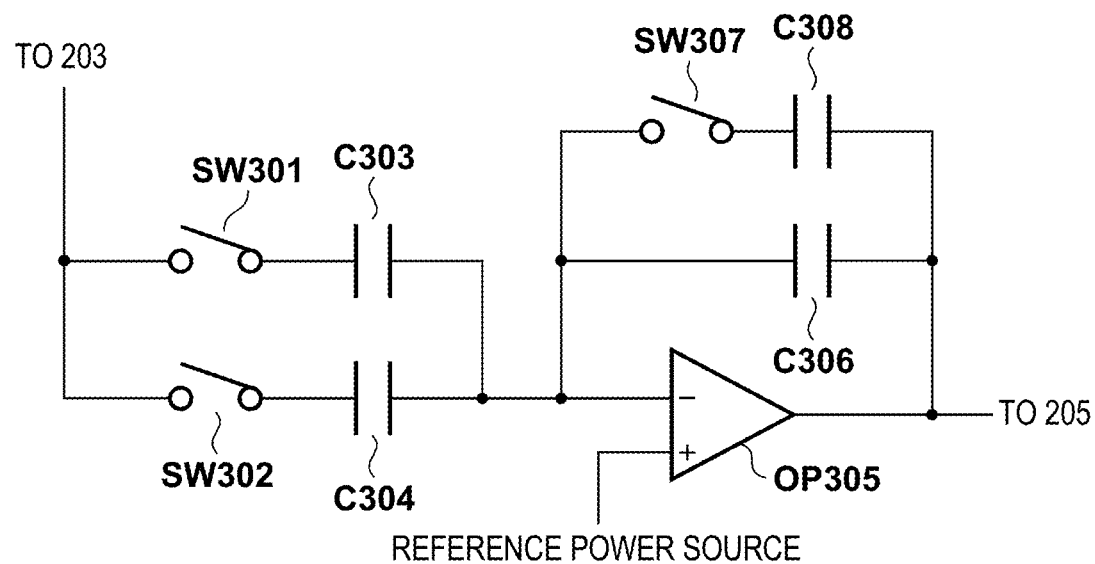
FIG. 6 is a diagram illustrating a configuration of a column AMP of the solid-state image sensor.

FIG. 6 is a diagram illustrating the operation of the column AMP unit 204 for generating the HDR image. FIG. 6 illustrates a circuit obtained by extracting a certain single column in the column AMP unit 204. Input capacitors and feedback capacitors are connected to an operation amplifier OP 305. A signal read from the pixel unit 203 is connected to input capacitors C303 and C304 by switches SW301 and SW302. Furthermore, feedback capacitors C306 and C308 are the feedback capacitors for the operation amplifier OP 305. The connection of the feedback capacitor C308 can be controlled with a switch SW307. Since the capacitors are used, the gain of the amplifier is obtained as input capacity/ feedback capacity. Since two input capacitors are included, the first image can be output by connecting the switch SW301, disconnecting the switch SW302, applying the gain of the input capacitor C303 and the feedback capacitor C306, and outputting to the column ADC 205. The second image can be output by disconnecting the switch SW301, connecting the switches SW302 and SW307, and applying the gain of the input capacitor C304 and the feedback capacitors C306 and C308. Thus, two images with different gains applied can be output.

In step S802 and step S803 in FIG. 3A, the overall control unit 110 executes this output of two images with different gains applied, under different exposure conditions, a plurality of times.

Figure 7A:
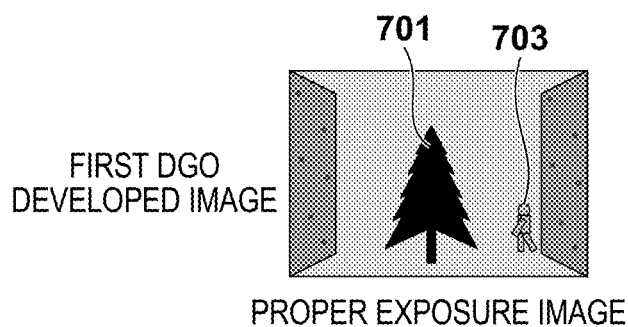
FIG. 7A to FIG. 7J are conceptual diagrams of developed images and combined images according to the first embodiment.
Figure 7B:
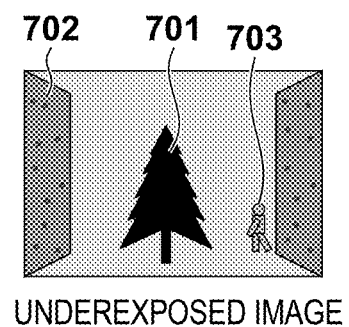
Figure 7C:
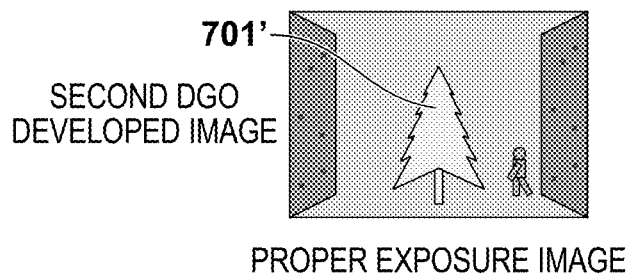
Figure 7D:
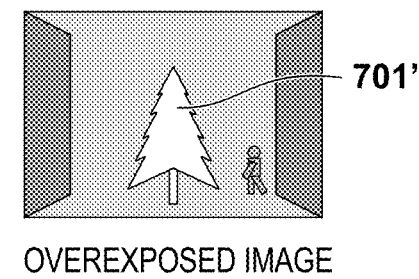

In this example, as illustrated in FIG. 7A and FIG. 7B, it is assumed that a proper exposure image (high gain image: FIG. 7A) and an underexposed image (low gain image: FIG. 7B) are acquired under the first exposure condition. As illustrated in FIG. 7C and FIG. 7D, it is assumed that a proper exposure image (low gain image: FIG. 7C) and an overexposed image (high gain image: FIG. 7D) are acquired under the second exposure condition. The image in FIG. 7A and the image in FIG. 7C, which are both proper exposure images, are captured with different exposure times, and thus are both processed to be substantially proper exposure (same exposure) images through gain adjustment.

Furthermore, it is assumed that the second (or the second and subsequent) exposure condition has an exposure time longer than that in the first exposure condition. More specifically, it is assumed that the exposure time in the second image capturing is longer than the period of the blinking of the flicker light source. In this case, the first image capturing is performed for an exposure time that is shorter than the period of the blinking of the flicker light source, and thus the captured image of a flicker light source 701 is darker than assumed, as illustrated in FIG. 7A and FIG. 7B. The second image capturing is performed for an exposure time that is longer than the period of the blinking of the flicker light source, and thus the captured image of the flicker light source 701 has correct brightness (indicated by reference sign 701').

Next, in step S804, the signal processing unit 104 performs development. In the present embodiment, a total of four images are acquired in performing image capturing twice, and the images are each developed to be a linear output to an input signal by applying a gain to each image. By this, as illustrated in FIG. 7A to FIG. 7D, an image having the same luminance can be generated for the same subject.

Next, in step S805, the image combining unit 105 performs HDR combining. HDR combining is described referring to FIG. 3C.

In step S820, the image combining unit 105 combines an image from the first proper exposure image (FIG. 7A) and the underexposed image (FIG. 7B). Using the underexposed image for high luminance portions with respect to the proper exposure image can expand the dynamic range of the high luminance portions.

In step S821, the image combining unit 105 performs alignment of the second captured images (FIG. 7C, FIG. 7D) with respect to the first captured images (FIG. 7A, FIG. 7B). This is because positional deviation due to camera shake and the like generated during the first and second image capturing needs to be corrected.

Figure 7E:
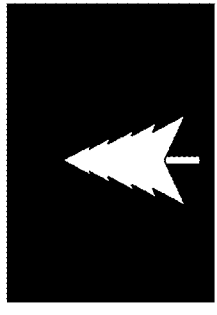

In step S822, the image combining unit 105 combines the overexposed image (FIG. 7D) captured in the second image capturing. The overexposed image captured in the second image capturing is used for low luminance portions with respect to the combined image obtained by the combining of the first captured image in step S820. Accordingly, as illustrated in FIG. 7H, noise 702 seen in FIG. 7A to FIG. 7C can be reduced, and the dynamic range of the low luminance portions can be expanded.

In step S823, the image combining unit 105 extracts the difference between the first proper exposure image (FIG. 7A) and the second proper exposure image (FIG. 7C). This is because there is a time lag between the first image capturing in step S802 and the second image capturing in step S803, which results in a difference in the regions of the moving body and the flicker light source. More specifically, the difference image (difference information) is as illustrated in FIG. 7E, and the portions of the flicker light source 701 and a person 703, who is a moving body, are extracted as a difference.

As a result of the difference extraction in step S823, when it is determined that there is a difference in step S824, then in step S825, the region with the difference detected (the region of the flicker light source 701 and the person 703) is overwritten with the output image obtained by the combining of the first captured images in step S820. In the example of FIG. 7A to FIG. 7J, the region of the flicker light source 701 and the person 703 in FIG. 7H is overwritten with the combined image of FIG. 7A and FIG. 7B. The resultant overwritten image is as in FIG. 7I.

Figure 7F:
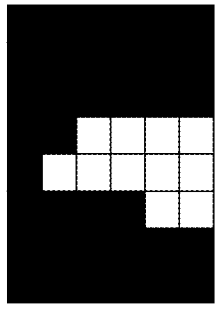
Figure 7G:
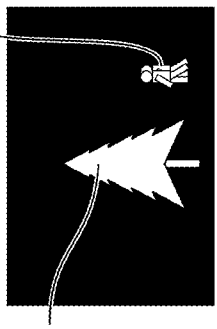
Figure 7H:
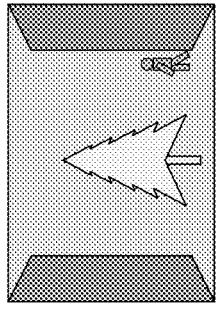
Figure 7I:
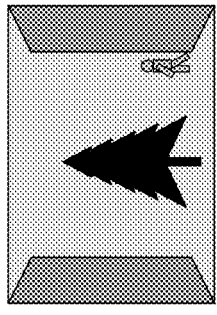

In this process, as illustrated in FIG. 7I, while the image of the portion of the person, who is a moving body, is improved, the portion of the flicker light source 701 is also overwritten, and thus the portion of the flicker light source 701 becomes darker than desired. The processing of further replacing the portion of the flicker light source 701 is described below.

In step S807 in FIG. 3A, the overall control unit 110 performs the flicker region replacement processing. The flicker region replacement processing is described with reference to FIG. 3D.

In step S831, the processing is performed in a case where the flicker region is detected as illustrated in FIG. 7F in step S801.

In step S832, the image combining unit 105 determines how roughly the image has been segmented into blocks for flicker detection in step S810. In a case where the image has been segmented into blocks more roughly than what is predetermined, the difference between the first proper exposure image (FIG. 7A) and the second proper exposure image (FIG. 7C) is extracted in step S833.

In step S834, as illustrated in FIG. 7G, the image combining unit 105 generates a mask region that is a region to be replaced later with the difference extracted in step S833 and the flicker region detected in step S801. In this way, even when a region other than the flicker region is included in a roughly-segmented block, the region other than the flicker region can be excluded from the mask region, with only the overlapping portion of the difference region and the flicker region serving as the mask region.

In step S832, in a case where the image has been finely segmented (finer than or equal to what is predetermined), the flicker region detected in step S801 serves as the mask region.

Figure 7J:
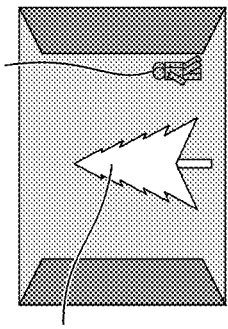
Figure 8A:
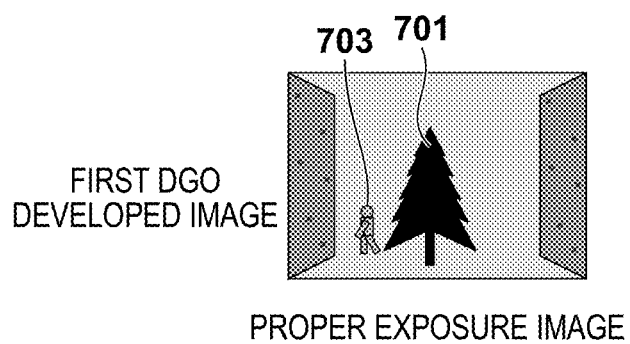
Figure 8B:
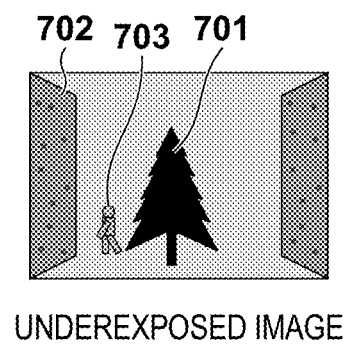
Figure 8C:
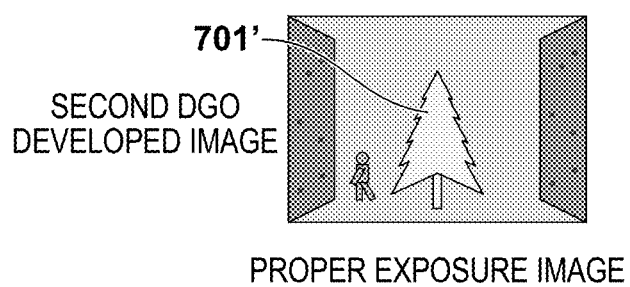
Figure 8D:
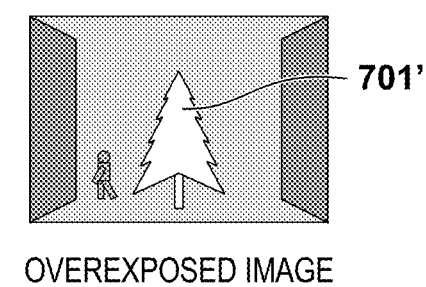
Figure 10C:
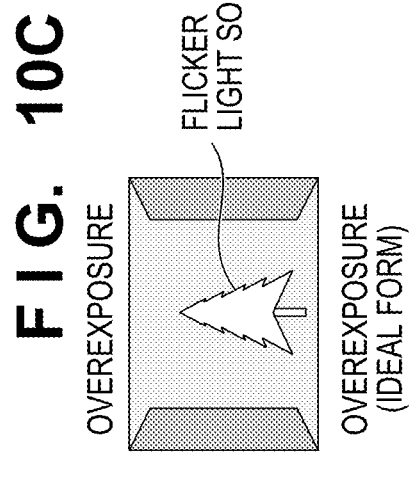
FIG. 10A to FIG. 10F are conceptual diagrams of captured images of the flicker light source.
Figure 10B:
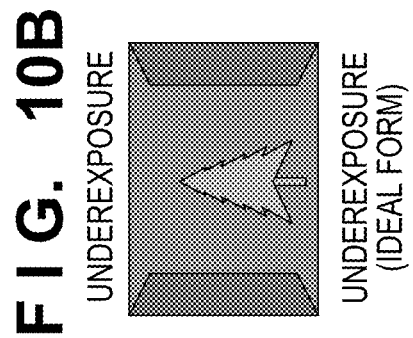
Figure 10A:
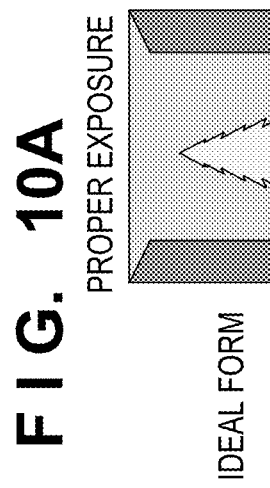
Figure 10F:
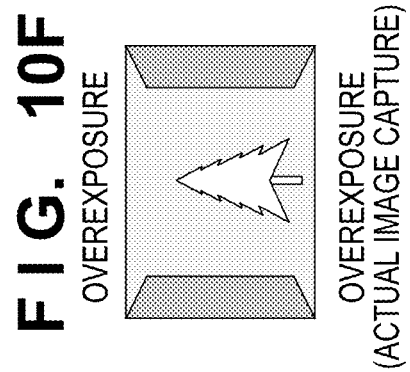
Figure 10E:
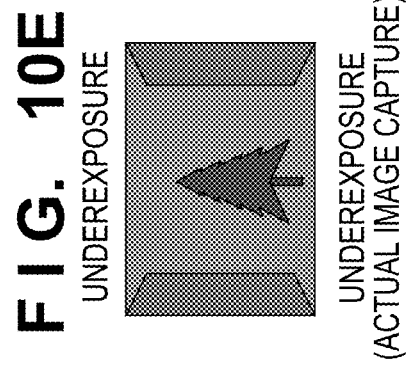
Figure 10D:
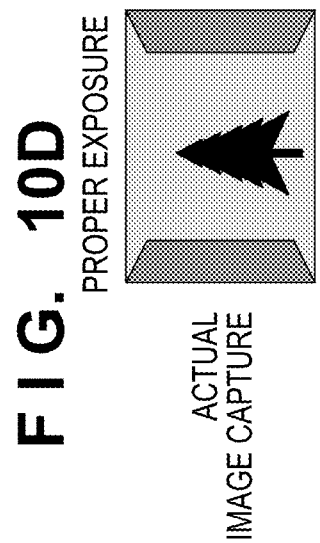

In step S836, the image combining unit 105 replaces this mask region with the second proper exposure image (FIG. 7C) as illustrated in FIG. 7J.

The processing described above allows a bright image of the flicker light source to be captured without relying on the exposure time and the flicker timing in generating an HDR image.

Note that the example described above is merely an example, and the number of times of image capturing is not limited to twice, and may be three or more times. Regarding the exposure conditions, the first exposure time may be longer. Furthermore, the order in the combining method is not limited.

Second Embodiment

In a second embodiment, a case where a moving body is present in a flicker region is described. Note that, among FIG. 8A to FIG. 8M for describing the second embodiment, FIG. 8A to FIG. 8E and FIG. 8K to FIG. 8M are the same as FIG. 7A to FIG. 7J in the first embodiment, and thus a description thereof is omitted.

When a moving body is present in a flicker region, simply replacing the flicker region and the difference region in the proper exposure image with the second proper exposure image causes the moving body present therein to be determined as a flicker light source as illustrated in FIG. 8G.

In this context, when the area of the flicker light source in the flicker segmented region is small or the area other than the flicker light source is large, reliability in the flicker segmented region decreases as illustrated in FIG. 8F. Thus, when the reliability of the flicker segmented region is low, the expression of the moving body and the flicker light source can be improved by changing the processing.

As an example, when the reliability is low, the region of the flicker segmented region is further segmented as illustrated in FIG. 8H to FIG. 8J. Statistical information on a difference component for each of the regions is used to determine which of the adjacent blocks has similar statistical information. In this case, as illustrated in FIG. 8H and FIG. 8I, the luminance difference, the color difference, or the like can be used as the difference component.

When an adjacent block has similar statistical information, it is possible to increase the accuracy in distinguishing low reliability portions in the flicker region through the same processing as that performed on the adjacent block. In this example, it is possible to distinguish a flicker light source, which is illuminations, from a person, who is a moving body. Accordingly, the expression of the region of the flicker light source can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-153619, filed Sep. 21, 2021, which is hereby incorporated by reference herein in its entirety.

What is claimed is:

1. An image capturing apparatus comprising:
an image sensor configured to be capable of outputting a plurality of images with different gains with a single exposure; and
at least one processor or circuit configured to function as:
a detection unit configured to detect flicker from image outputs from the image sensor,
an acquisition unit configured to acquire, by performing a plurality of times of image capturing with different exposure times using the image sensor, a plurality of images with different gains in each of the plurality of times of image capturing; and
a combining unit configured to combine the images acquired by the acquisition unit,
wherein the combining unit uses an image obtained by image capturing with a longer exposure time among the plurality of times of image capturing with the different exposure times for combining for a region of a flicker light source, and
wherein the acquisition unit acquires a proper exposure image and an underexposed image in a single time of image capturing and acquires a proper exposure image and an overexposed image in another single time of image capturing.

2. The image capturing apparatus according to claim 1, wherein the acquisition unit sets a longer exposure time for second and subsequent times of image capturing than the exposure time for a first time of image capturing.

3. The image capturing apparatus according to claim 1, wherein the longer exposure time for the image capturing is longer than a period of blinking of the flicker light source.

4. An image capturing apparatus, comprising:
an image sensor configured to be capable of outputting a plurality of images with different gains with a single exposure; and
at least one processor or circuit configured to function as:
a detection unit configured to detect flicker from image outputs from the image sensor,
an acquisition unit configured to acquire, by performing a plurality of times of image capturing with different exposure times using the image sensor, a plurality of images with different gains in each of the plurality of times of image capturing; and
a combining unit configured to combine the images acquired by the acquisition unit,
wherein the combining unit uses an image obtained by image capturing with a longer exposure time among the plurality of times of image capturing with the different exposure times for combining for a region of a flicker light source,
wherein the acquisition unit acquires images such that at least one image has same exposure among the plurality of times of image capturing,
wherein the combining unit uses the image obtained by image capturing with the longer exposure time among the images having the same exposure for combining for the region of the flicker light source, and
wherein the acquisition unit acquires images having the same exposure by adjusting a gain for images obtained by the plurality of times of image capturing with different exposure times.

5. The image capturing apparatus according to claim 4, wherein the at least one processor or circuit is configured to further function as a detection unit configured to detect a moving body,
wherein the detection unit detects the moving body from a difference in the images having the same exposure.

6. The image capturing apparatus according to claim 4, wherein the combining unit replaces the region of the flicker light source in a combined image with the image obtained by image capturing with the longer exposure time among the images having the same exposure.

7. The image capturing apparatus according to claim 4, wherein the at least one processor or circuit is configured to further function as
a detection unit configured to detect a flicker light source for each segmented region obtained by segmenting an image captured by the image sensor into a plurality of regions.

8. The image capturing apparatus according to claim 7, wherein the detection unit detects a region of the flicker light source based on difference information on the images having the same exposure and information on the flicker light source in the segmented region in a case where segmentation of the segmented region is rougher than what is predetermined.

9. The image capturing apparatus according to claim 7, wherein the detection unit detects a region of the flicker light source based on information on the flicker light source in the segmented region in a case where segmentation of the segmented region is equal to or finer than what is predetermined.

10. A method of controlling an image capturing apparatus including an image sensor configured to output a plurality of images with different gains with a single exposure, the method comprising:
detecting flicker from image outputs from the image sensor,
acquiring, by performing a plurality of times of image capturing with different exposure times using the image sensor, a plurality of images with different gains in each of the plurality of times of image capturing; and
combining the images acquired in the acquiring,
wherein in the combining, an image obtained by image capturing with a longer exposure time among the plurality of times of image capturing with the different exposure times is used for a region of a flicker light source, and
wherein in the acquiring, a proper exposure image and an underexposed image in a single time of image capturing are acquired, and a proper exposure image and an overexposed image in another single time of image capturing are acquired.

11. A non-transitory computer-readable storage medium storing a program for causing a computer to execute each process in a method of controlling an image capturing apparatus including an image sensor configured to output a plurality of images with different gains with a single exposure, the method comprising:
detecting flicker from image outputs from the image sensor,
acquiring, by performing a plurality of times of image capturing with different exposure times using the image sensor, a plurality of images with different gains in each of the plurality of times of image capturing; and
combining the images acquired in the acquiring,
wherein in the combining, an image obtained by image capturing with a longer exposure time among the plurality of times of image capturing with the different exposure times is used for a region of a flicker light source, and
wherein in the acquiring, a proper exposure image and an underexposed image in a single time of image capturing are acquired, and a proper exposure image and an overexposed image in another single time of image capturing are acquired.

12. A method of controlling an image capturing apparatus including an image sensor configured to output a plurality of images with different gains with a single exposure, the method comprising:
detecting flicker from image outputs from the image sensor,
acquiring, by performing a plurality of times of image capturing with different exposure times using the image sensor, a plurality of images with different gains in each of the plurality of times of image capturing; and
combining the images acquired in the acquiring,
wherein in the combining, an image obtained by image capturing with a longer exposure time among the plurality of times of image capturing with the different exposure times is used for a region of a flicker light source,
wherein in the acquiring, at least one image has same exposure among the plurality of times of image capturing, wherein the combining unit uses an image obtained by image capturing with a longer exposure time among the plurality of times of image capturing with the different exposure times for combining for a region of a flicker light source, wherein in the acquiring, at least one image has same exposure among the plurality of times of image capturing, wherein in the combining, the image obtained by image capturing with the longer exposure time among the images having the same exposure is used for combining for the region of the flicker light source, and wherein in the acquiring, images having the same exposure by adjusting a gain for images obtained by the plurality of times of image capturing with different exposure times are acquired.

13. A non-transitory computer-readable storage medium storing a program for causing a computer to execute each process in a method of controlling an image capturing apparatus including an image sensor configured to output a plurality of images with different gains with a single exposure, the method comprising:

detecting flicker from image outputs from the image sensor, acquiring, by performing a plurality of times of image capturing with different exposure times using the image sensor, a plurality of images with different gains in each of the plurality of times of image capturing; and combining the images acquired in the acquiring, wherein in the combining, an image obtained by image capturing with a longer exposure time among the plurality of times of image capturing with the different exposure times is used for a region of a flicker light source, wherein in the acquiring, at least one image has same exposure among the plurality of times of image capturing, wherein the combining unit uses an image obtained by image capturing with a longer exposure time among the plurality of times of image capturing with the different exposure times for combining for a region of a flicker light source, wherein in the acquiring, at least one image has same exposure among the plurality of times of image capturing, wherein in the combining, the image obtained by image capturing with the longer exposure time among the images having the same exposure is used for combining for the region of the flicker light source, and wherein in the acquiring, images having the same exposure by adjusting a gain for images obtained by the plurality of times of image capturing with different exposure times are acquired.

* * * * *